United States Patent
Pietryga et al.

(10) Patent No.: US 6,641,201 B1
(45) Date of Patent: Nov. 4, 2003

(54) CONVERTIBLE BED COVER FOR A VEHICLE

(75) Inventors: Brad L Pietryga, Shelby Township, MI (US); James C. Ostrand, Lenox, MI (US); Thomas A. Ebi, Dearborn, MI (US); Wieslaw Stanislaw Zaydel, Rochester, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/245,197

(22) Filed: Sep. 17, 2002

(51) Int. Cl.$^7$ .................................................. B60P 7/02
(52) U.S. Cl. ........................... 296/100.1; 296/100.03; 296/100.05; 296/100.06; 296/100.01
(58) Field of Search ................... 296/100.01–100.06, 296/100.1, 222, 223, 225, 183, 76, 146.8, 51, 56, 106, 107.2, 107.18, 108, 216.04, 216.05

(56) References Cited

U.S. PATENT DOCUMENTS

| | | | | |
|---|---|---|---|---|
| 3,675,967 A | * | 7/1972 | Ahrens ................... | 296/100.03 |
| 3,823,977 A | * | 7/1974 | Fioravanti .............. | 296/107.17 |
| 3,910,629 A | * | 10/1975 | Woodard .................... | 296/101 |
| 4,152,872 A | * | 5/1979 | Tanizaki et al. ............... | 49/214 |
| 4,272,121 A | * | 6/1981 | Kim ........................... | 296/216 |
| 4,620,743 A | * | 11/1986 | Eke ............................. | 296/56 |
| 4,630,858 A | * | 12/1986 | Bez ............................ | 296/216 |
| 4,789,196 A | | 12/1988 | Fields | |
| 4,932,715 A | * | 6/1990 | Kramer ....................... | 296/155 |
| 5,031,949 A | * | 7/1991 | Sorimachi et al. ............ | 296/76 |
| 5,031,959 A | * | 7/1991 | Queveau ..................... | 296/223 |
| 5,203,364 A | * | 4/1993 | Koole ........................ | 135/148 |
| 5,531,497 A | | 7/1996 | Cheng | |
| 5,906,071 A | * | 5/1999 | Buchanan, Jr. .............. | 49/360 |
| 6,234,560 B1 | * | 5/2001 | Hunt ..................... | 296/100.11 |
| 6,305,740 B1 | * | 10/2001 | Staser et al. ................. | 296/222 |
| 6,336,674 B1 | * | 1/2002 | Gerisch et al. ........ | 296/146.16 |
| 6,485,094 B2 | * | 11/2002 | Corder et al. ............... | 296/222 |
| 6,494,528 B2 | * | 12/2002 | Tolinski et al. ........ | 296/216.04 |
| 6,497,448 B1 | * | 12/2002 | Curtis et al. ............. | 296/146.8 |
| 6,505,878 B1 | * | 1/2003 | Mascolo ................ | 296/100.04 |

* cited by examiner

Primary Examiner—Dennis H. Pedder
Assistant Examiner—G Blankenship
(74) Attorney, Agent, or Firm—Laura C. Hargitt

(57) ABSTRACT

A vehicle body has a roof-enclosed passenger compartment and a rear cargo compartment. The cargo compartment has a cover and a tailgate to close the cargo compartment. The cover is movable along a pair of tracks from its closed position on the cargo compartment to a stowed position on top of the passenger compartment. The cover has an intermediate position above the cargo compartment which serves as a camper top and with the addition of zip-on side covers converts the vehicle body to a camper. The intermediate position of the cover in conjunction with the roof of the vehicle body also provides support for hauling long cargo.

13 Claims, 13 Drawing Sheets

CONVERTIBLE BED COVER FOR A VEHICLE

TECHNICAL FIELD

This invention relates to a vehicle body with a rear cargo compartment covered by a cargo cover which is movable between a covering position and a stowed position.

BACKGROUND OF THE INVENTION

Prior art vehicles have been configured as trucks, sport utility vehicles (SUVs), and cross-overs such as the Avalanche® made by General Motors Corporation. They are all utilitarian in that compartments are provided for cargo and passengers. Some have a midgate between the compartments to facilitate pass-through. Others have a midgate to subdivide the bed of a pickup truck and a movable cover to enclose a lockable section of the bed (see U.S. Pat. No. 5,531,497 issued to Cheng, Jul. 2, 1996). The passenger compartment is normally covered, and may include a sunroof. The cargo compartment has in the past been provided with a cover which is removable for access to the cargo compartment and replaceable to protect the cargo from the elements. Such prior art covers are labor-intensive in folding up to remove and store. They collect dirt and are heavy when they have to be removed from inside the bed area. This also requires climbing into the bed. There are other covers such as soft bed covers, standard tip-up bed covers, roll up sunshade-type covers, all of which impede midgate flexibility.

SUMMARY OF THE INVENTION

This invention provides the rear cargo compartment of a vehicle with a lid or cover storage system for covering cargo in the rear compartment. The cover is hinged in the front by a hinge-guide member which is movably attached to a set of guides or rails fixed on the roof. A single piece cover is first moved by tipping it up along the leading edge and then using tracks or rails to move the cover up to the roof. During normal operation, the cover may be opened and closed like a trunk lid. The height of a tipped-up cover should be easily reachable by the user. During transport of tall items, the cover of this invention can be moved out of the way for storage on the roof of the vehicle. Between the closed and stowed positions, the cargo cover has intermediate raised positions horizontally above the rear compartment. These raised positions may be used to convert the rear compartment to a camper or to haul long cargos. A transfer system controls the movement of the cover and includes the guide rails, hinge-guide members and extendable struts. Cover movement is accomplished by a modified motor-driven cable such as used in sunroofs. The cable pulls the cover along the guide rail onto the roof. Once on the roof, the cover is secured. During movement of the cover from a stowed position to a covering position, the cover is guided at its front edge by a pair of guide rails on opposite sides of the passenger compartment and by a pair of gas struts at the rear of the cover. The struts may be extendable or telescopic. They may also be automatic and power operated so that struts can be stopped in interim positions or shortened to minimize the overall height of the cover in its tipped-up position and to restrain the forward movement of the cover in its stowed position.

No interior storage space is lost for stowage of the covers and there are no dirty covers to fold up or panels to remove and store. The operation may require no lifting and the operator never has to leave the ground. A lockable secure storage area easily converts to an open storage area by moving the self-stowing cargo cover to the roof area. The movement of the cover may be initiated by a switch on a key fob or by one or more switches on the vehicle. A hinge-guide member includes a roller bracket design, which prevents seal scrub or abrasion and allows the roof track to be inside of the outboard edge of the cargo cover. This track also provides a rest surface for the stowed cover and is configured as a lift assist for failed gas struts. The track may also be configured to serve as a luggage rack.

In general, the hinge-guide member is attached to a threaded cable which is pinion-driven to move the cover between stowed and covering positions. The transfer system is power-operated to ease its operation. A pair of motors may be used to rotate the pinions which drive the cable. A properly sized single motor may also be used. The motors are on the roof of the vehicle body in front of the guide rails. A spoiler at this location is used to deflect air flow when the vehicle is moving and to cover the motors for protection from the environment. The spoiler may be configured to blend the juncture of stowed cover and spoiler into an aesthetic appearance.

The hinge-guide member of the transfer system has a guide portion or roller bracket which is in a movably guideable relationship with the guide rails and a hinge portion which enables pivoting of the cover. The guide portion of the hinge guide member includes rollers which interfit with a C-shape track or rail portion of the assembly during cover travel. The transfer system also defines spaced cableways on opposite sides of the C-shape track to guide and receive the threaded cable portions as they are pullingly driven and pushingly payed out by the teeth of a rotating pinion or pinions.

Each guide rail or track of the transfer system is positioned along the top and back of the passenger compartment. The rail angles at substantially 55 degrees and 45 minutes where the rail at a 150 mm radius curves from the top to the back of the passenger compartment so that the cover can travel smoothly between covering, camper and stowed positions. This travel results in movement through substantially a 130 degree track angle. This angle is not critical and includes a range of angles that is package dependent. The 150 mm radius is not critical. It is important, however, that the radius be sufficient to reduce binding of the cable attachment in the track. A larger radius allows for a longer more robust attachment of the cable to the roller bracket. The cable attachment is sufficiently long to carry the required load in pulling the cargo cover without binding in either the straight or curved portions of the track. The radius also needs to be large enough to facilitate smooth movement of the cover and interface cable loading. The chosen degree of track angle allows for the use of a mechanical dovetail retention along the leading edge of the cover. The track angle also cooperates with the configuration of the roller bracket to maintain the functionality of the midgate and the midgate sealing.

Accordingly, the invention is for a vehicle body defining a passenger compartment, a cargo compartment, and a midgate opening between the passenger compartment and the cargo compartment. A cargo cover is selectively movable between a first position for covering the cargo compartment and a second position for uncovering the cargo compartment. The combination includes a transfer system for moving the cargo cover by cable between the first and second positions. The transfer system comprises a rail overlaying the passenger compartment at the second position and curvingly extending about 55 degrees from the passenger compartment to the midgate opening and the cargo compartment at the first position. The radius of the curve is sufficiently large to facilitate smooth movement of the cover and interface cable loading. The transfer system also comprises a hinge-guide member which has a guide portion or roller bracket in a movably guideable relationship with the rail and a hinge portion in a pivotable hinge relationship with one portion of the cargo cover. The roller bracket may be configured as a bifurcated roller support with a curved extension for the hinge. The transfer system also comprises an extendable strut which has one end in pivotably fixed or slidable relationship to the vehicle body, with another end in pivotably fixed relationship to another portion of the cargo cover. The length of the strut selected determines the maximum height the cover can reach in its movement and limits the forward movement of the cover in its stowed position. The strut can be shortened to minimize or limit the highest movement of the cover in its travel. This means less than the seven foot opening of a garage door at the tip-up position of the cover and throughout its travel to the roof stowed position. A movement controlling strut may also be used to stop the cover in predetermined interim positions short of a sunroof or roof edge or rail end and to stay clear of any antenna or other obstruction as it reaches the stowed position.

The invention also includes a transfer system for raising a cover from a lower position against the seal of a midgate opening to a raised position remote from the seal. The system includes a rail curvingly extendable from the raised position toward a seal at the lower position. The transfer system also includes a hinge-guide member positionable between the cover and the curved rail and having a hinge portion and a guide portion and in which the guide portion has a bifurcated roller bracket with a pair of spaced rollers rotatably movable along the curve of the guide rail and a curved extension pivotably connected to the hinge portion. The location of the hinge portion with respect to the cover and the configuration of the curved extension on the roller bracket, the curve of the rail and the tangential connection of the cable to roller bracket all cooperate surprisingly to assist in raising the cover without scrubbing the seals when the transfer system is used for raising the cover.

The transfer system also has a drivable threaded cable to which the roller bracket is tangentially connected at the curved rail and a transmission including one or more rotatable pinions in a driving relationship with the cable and operable to pull the cable to move the cargo cover and to push the cable to stow the cable as the cargo cover is moved. The cargo cover may be held in its stowed or other positions by the rack and pinion relationship between threaded cable and pinion. This means the cover cannot back-drive the pinion motor. Two or more pinions may be used to reduce the load between cable and pinion. This allows a light duty cable to handle a 30 G load requirement.

The hinge-guide member of the transfer system interconnects the curved rail to the movable cover. The guide portion of the hinge-guide member has a bifurcated end and a curved extension. A roller is on each branch of the bifurcation and is adapted for rotatable movement with respect to the rail. A cable attachment bracket is removably connectable with the roller bracket and includes a cable interface crimpable onto the cable and tangent to the rail. The hinge portion is pivotably connected to the curved extension and adapted for affixation to the cover.

One or more latches may be provided for securing the cargo cover in at least one of its positions.

The vehicle body of this invention may include a spoiler on the passenger compartment in front of the cargo cover in its stowed position to deflect airflow when the vehicle body is moving and to protect any motor or transmission in the transfer system.

The above objects, features, advantages, and other objects, features and advantages of the present invention are readily apparent from the following detailed description of the preferred embodiment when taken in connection with the accompanying drawings.

DETAILED DESCRIPTION OF THE PREFERRED EMBODIMENTS

Figure 1:
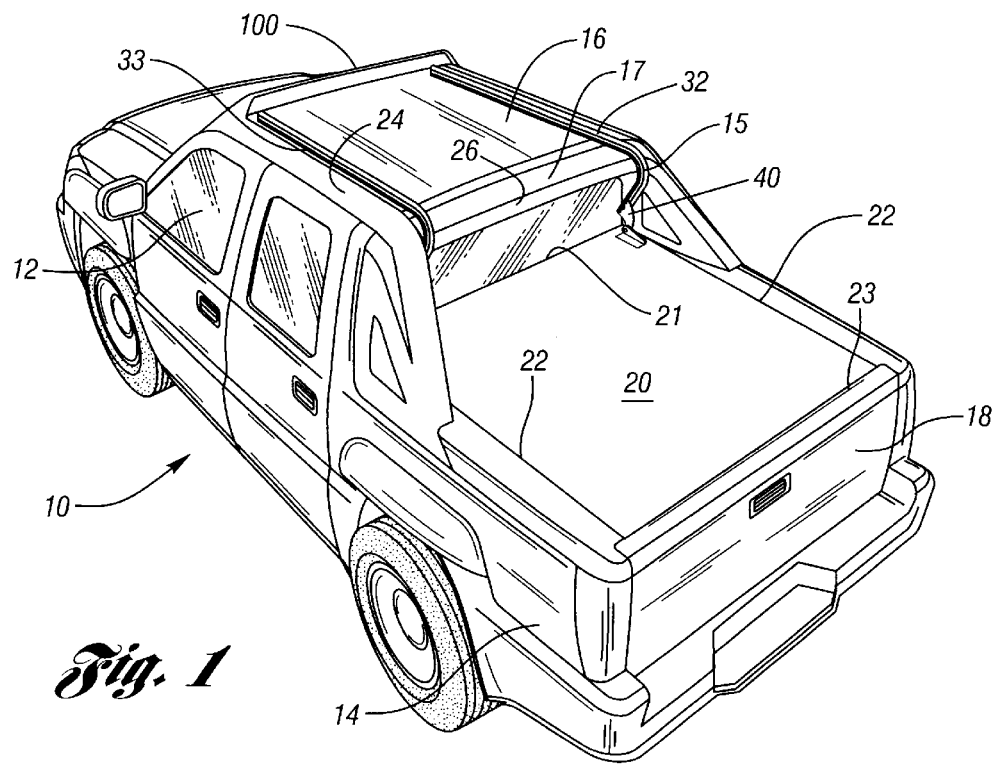
FIG. 1 is a rear perspective view of a vehicle body with a cargo cover and tailgate shown in the closed position and with an air spoiler at the front of the passenger compartment.
Figure 2:
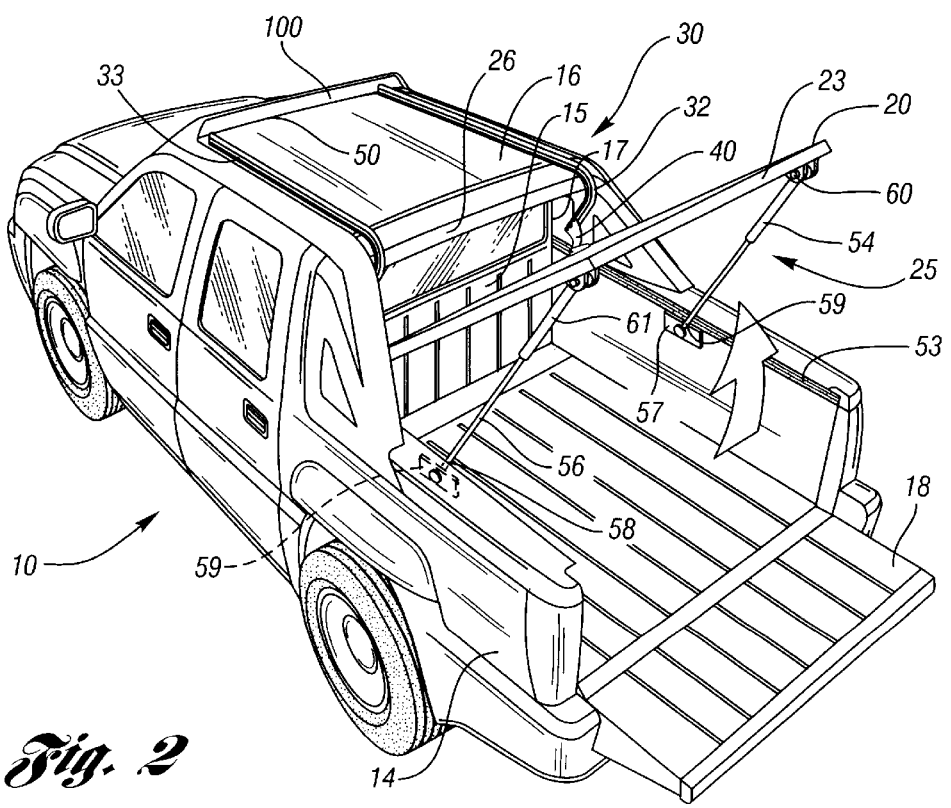
FIG. 2 is a rear perspective view of the vehicle body with the cargo cover shown (arrow) movable to the tipped-up open position and with the tailgate open.

With reference to FIGS. 1 and 2, a vehicle body 10 has a passenger compartment 12 and a rear cargo compartment 14 separated by a midgate 15. The midgate closes and seals a midgate opening 17 between the passenger compartment and the cargo compartment. The passenger compartment 12 is enclosed on the top thereof by a roof panel 16. The cargo compartment 14 is enclosed at the rear by a tailgate 18 and a cargo cover 20. The periphery of the cargo cover includes a leading edge 21, side edges 22, and trailing edge 23. The cargo cover 20 is selectively manually movable between a first position (FIG. 1) for covering the cargo compartment and a second tipped-up position (FIG. 2) for uncovering the top of the cargo compartment much like a trunk lid of a sedan-type vehicle. An extendable strut system 25 is connected to the trailing edge 23 of the cover and may also provide for full power actuation between the first covering position to the second tipped-up position.

Figure 4:
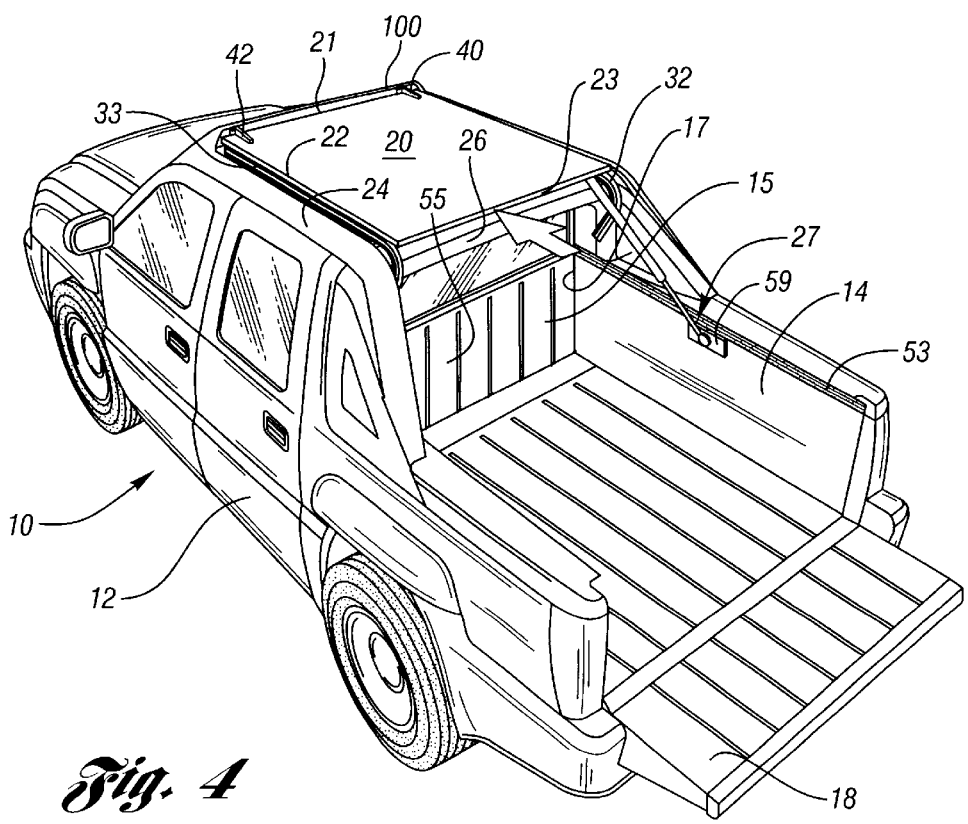
FIG. 4 is a rear perspective view of the vehicle body with the cargo cover shown (arrow) movable to the stowed position and the tailgate open.

A seal system 27 described more fully hereinafter is provided between the cargo cover 20 and the midgate 15, tailgate 18 and the sidewalls of the rear cargo compartment 14, as shown in FIG. 4. The seal system protects any cargo from the environment.

Figure 10:
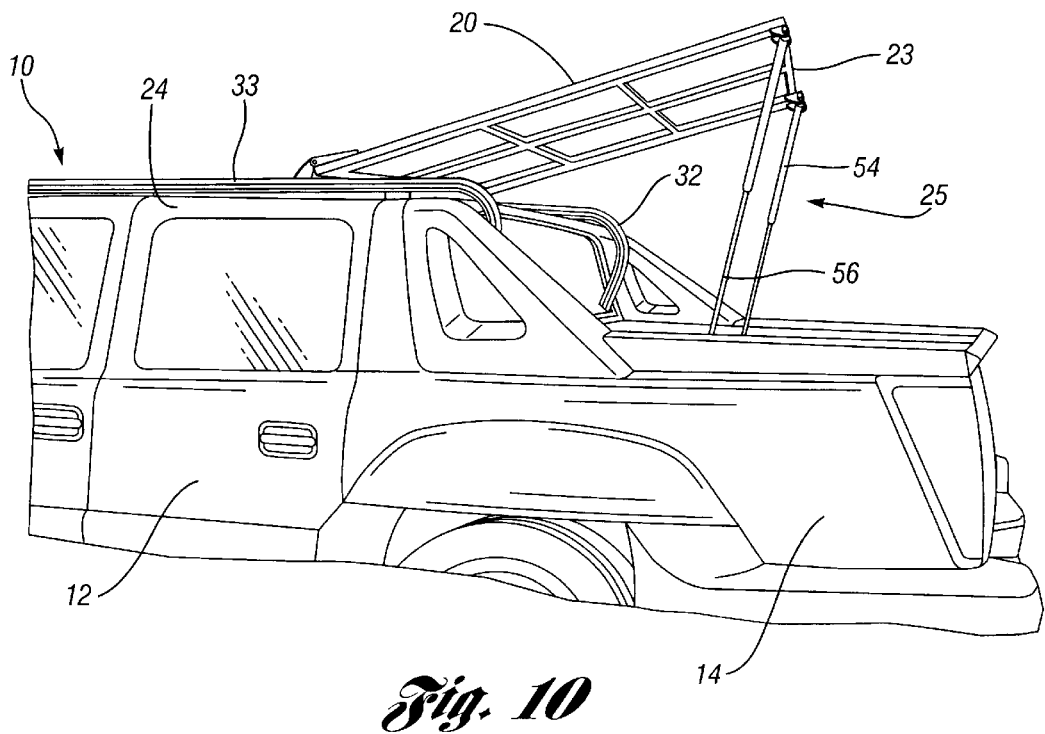

The cargo cover 20 is also selectively power movable to a stowed position (FIG. 4) on top of the passenger compartment 12. There are other intermediate positions described hereinafter for converting the vehicle into a camper (FIG. 3) and for positioning the cargo cover for tall loads (FIG. 10). A transfer system 30 (FIG. 19) controls the power movement of the cargo cover as the cover moves from closed position to stowed position and to the intermediate positions in between.

Figure 5:
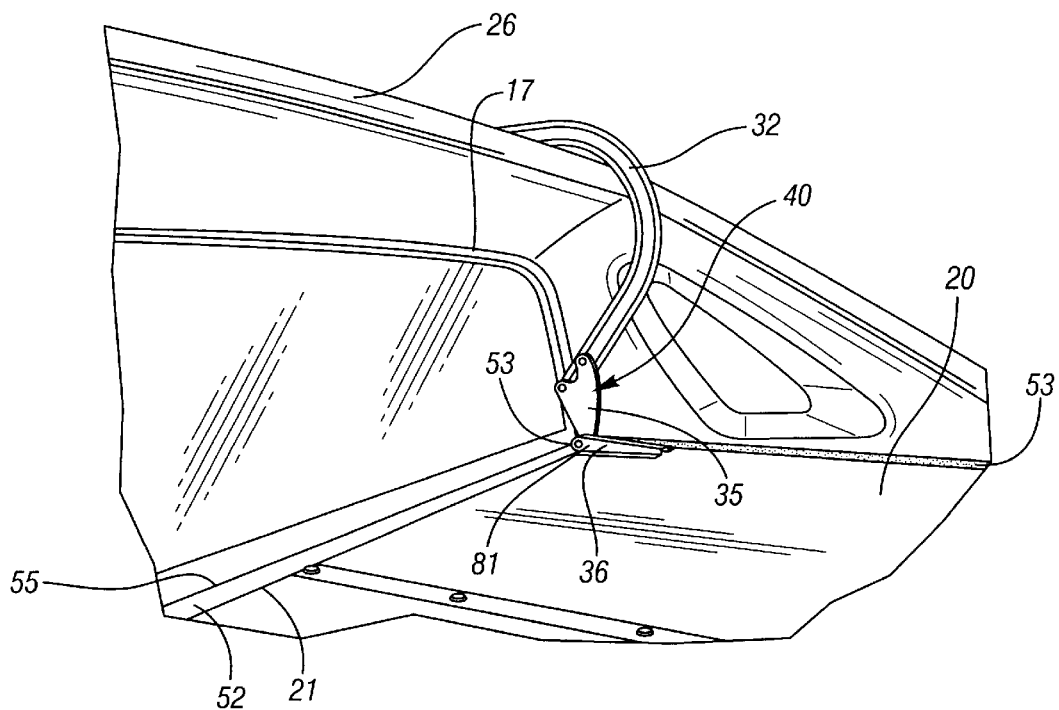
FIG. 5 is a fragmentary perspective view of the right side curved guide rail assembly shown schematically in FIG. 6 and with the hinge-guide member, C-shaped track and cargo cover oriented in the closed position.
Figure 19:
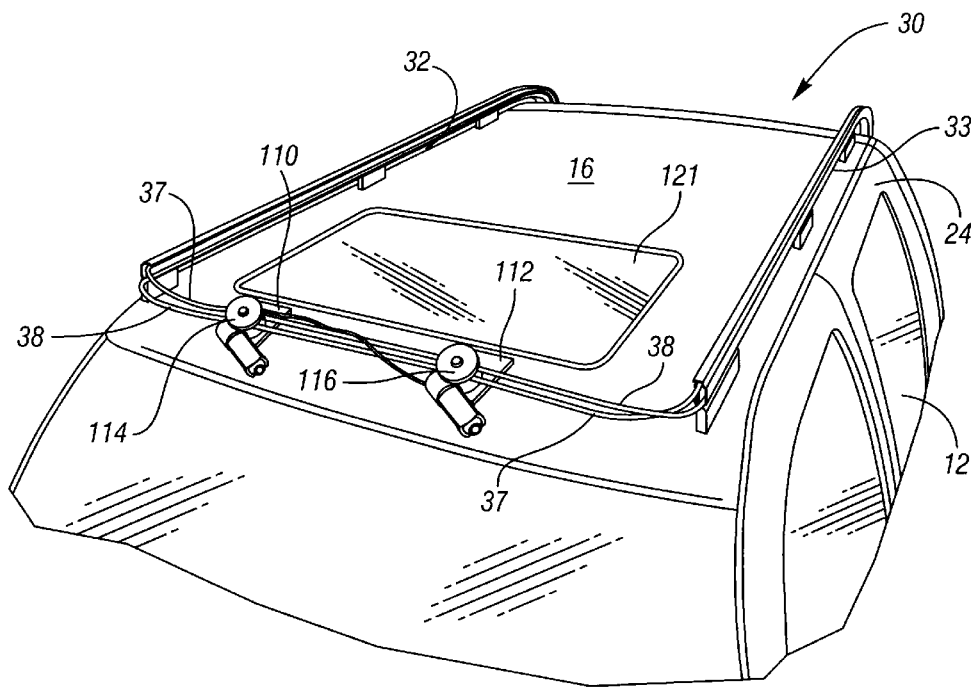
FIG. 19 is a fragmentary top perspective view of a vehicle body and the transfer system with the air spoiler removed to show the passenger compartment with the guide rail assemblies on the vehicle roof extending from back to front, and with a pair of drive motors and transmissions connected to cableways leading to the guide rail assemblies at the front of the vehicle roof.
Figure 20:
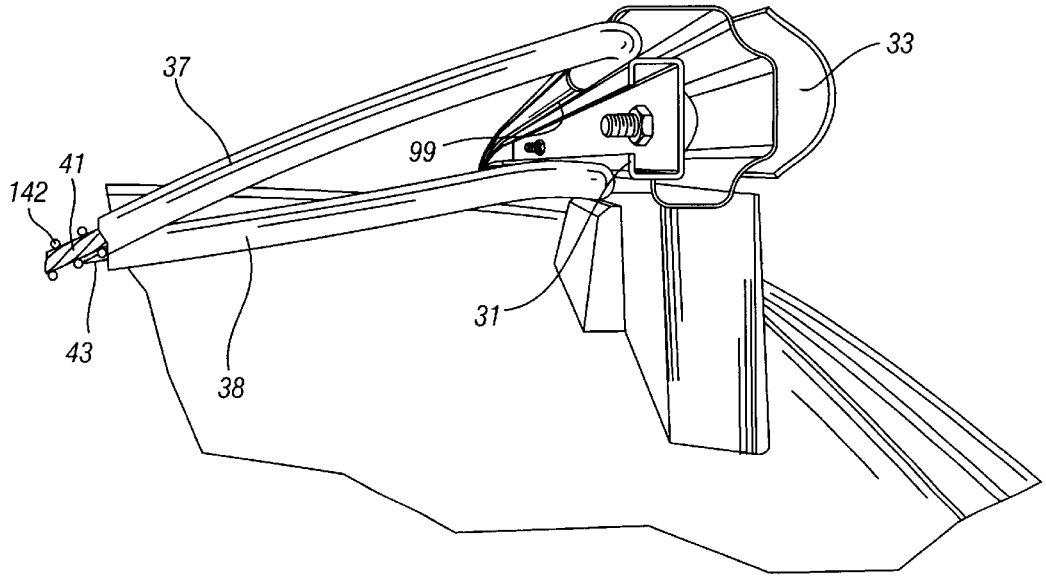
FIG. 20 is an enlarged fragmentary view of the C-shaped rail in the guide rail assembly of the transfer system of FIG. 19.
Figure 21:
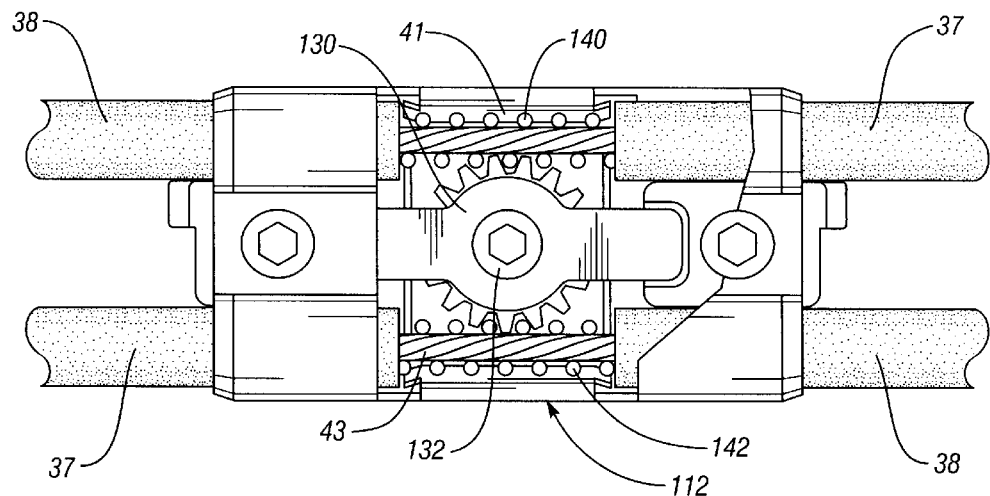
FIG. 21 is a perspective view of one of the two motor operable transmissions in FIG. 19 showing a driving relationship with each one of a pair of cables usable for moving the cargo cover by pulling the hinge-guide members of the transfer system.

A curved guide rail assembly 32,33 (FIGS. 1–4) overlays the passenger compartment 12 at the stowed position on each side of the roof panel 16 over the passenger compartment. Hinge-guide member 40,42 (FIG. 5) respectively on opposite sides of the leading edge 21 of the cargo cover 20 control the movement of the cargo cover as it moves from closed position through the intermediate positions to the stowed position. Each hinge-guide member includes a guide or roller bracket portion 35 including an anti-rotation, anti-binding cable attachment bracket 46, and a hinge portion 36. An end view of one of the rail assemblies on the left side of the vehicle is shown in FIG. 20. There, a C-shaped track portion 31 of the rail assembly 33 supports a pair of cableways 37 and 38. These cableways serve as tunnels for cables 41,43 being respectively pulled and then pushed through the tunnels by one or more motor operated transmissions 110, 112 (FIGS. 19 and 21). Each cableway has a load portion (cable in tension) on one side of its transmissions and a guide and storage portion (cable slack) on the other side of its transmissions. Brass may be used for the load portion of cableway 37 and plastic for the guide portion of cableway 38, although material choice for these tunnels may extend to other similar materials.

Thus the transfer system 30 includes a rail 32, 33 overlaying the passenger compartment 12 at the second position (FIG. 4) and extending along the passenger compartment and the midgate opening 17 to the cargo compartment 14 at the first position (FIG. 1), a hinge-guide member 40, 42 having a guide or roller bracket portion 35 in a movably guideable relationship with the rail, and a hinge portion 36 in a pivotable hinge relationship with one portion of the cargo cover, and an extendable strut 54, 56 having one end in pivotal relationship to the vehicle body and another end in pivotally fixed relationship to another portion of the cargo cover.

Figure 6:
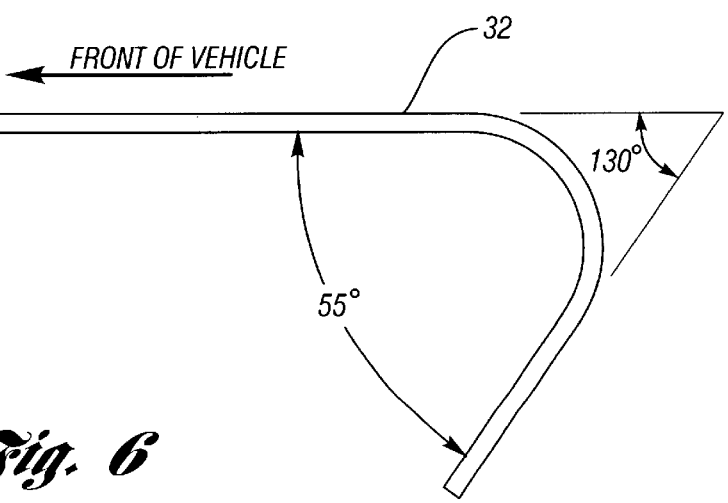
FIG. 6 is a fragmentary schematic of one side of the rail or track curve showing a track angle of 55 degrees and 45 minutes and a curve travel around substantially 130 degrees.
Figure 7:
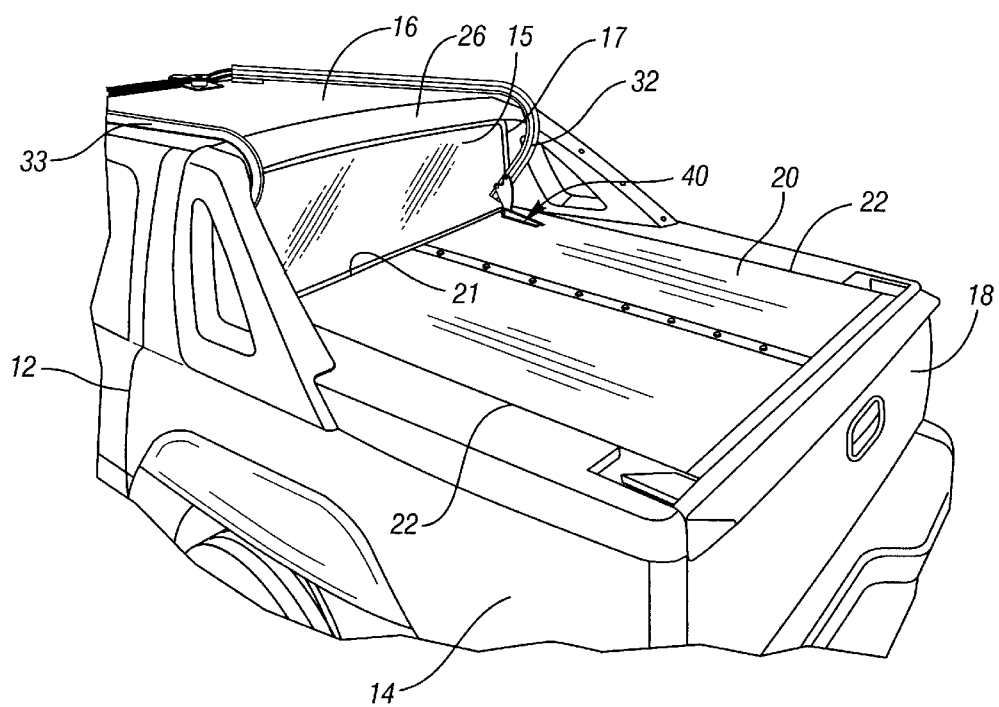
FIG. 7 is a fragmentary perspective view of a vehicle body with the cargo cover and tailgate in a covered and closed position.
Figure 8:
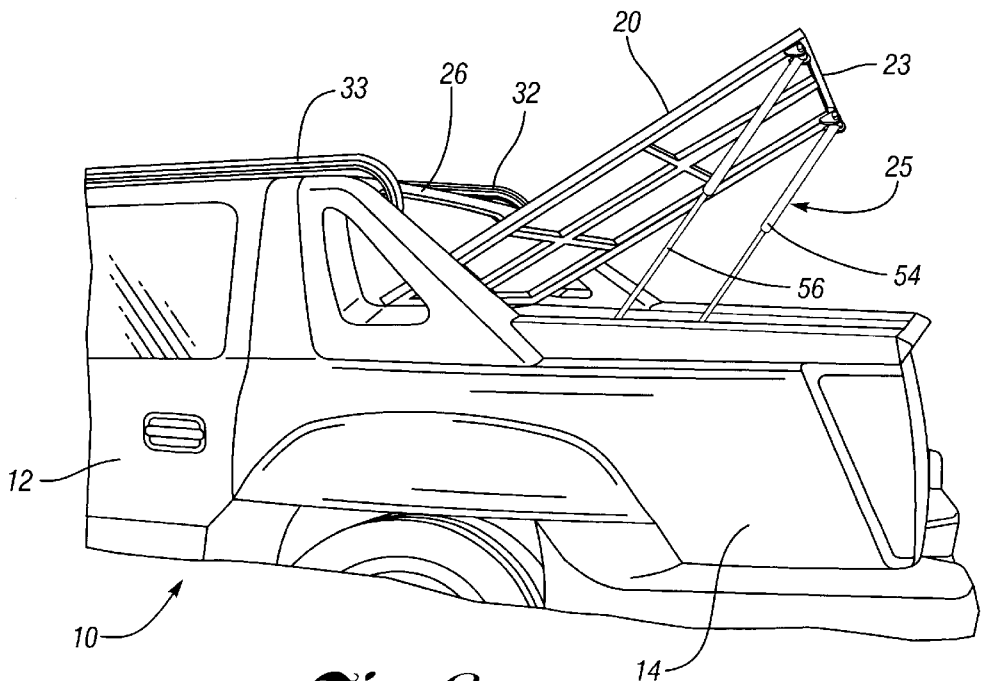
FIG. 8 is a fragmentary perspective view of a vehicle body with the cargo cover in a partially raised, tipped-up (trunk-open) position to uncover the cargo compartment when the hinge-guide portion of the cargo cover is at the lowermost part of the curved guide rail assembly.
Figure 9:
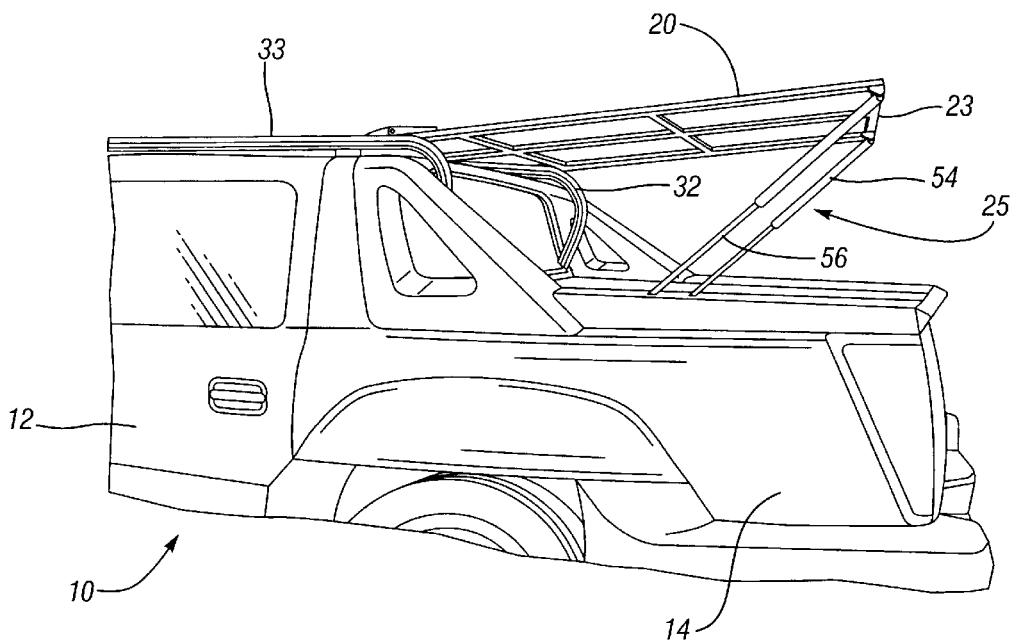
FIGS. 9 and 10 are fragmentary perspective views of the cargo cover in successive raised positions prior to entering its stowed position on the guide rails on top of the passenger compartment.
Figure 12:
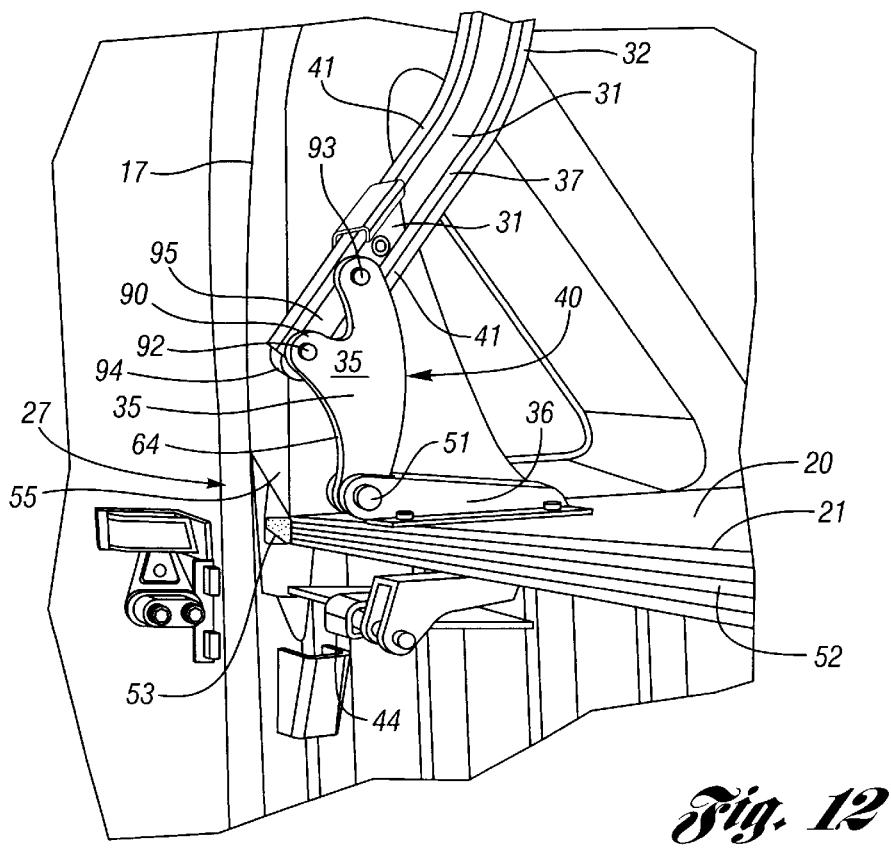
FIG. 12 is an enlarged fragmentary view of a dovetail interlock between the leading edge of the cover and the vehicle body and with the hinge-guide member at the lowermost end of the curved guide rail on the inside of the right side of the vehicle at the midgate opening with seal.
Figure 17:
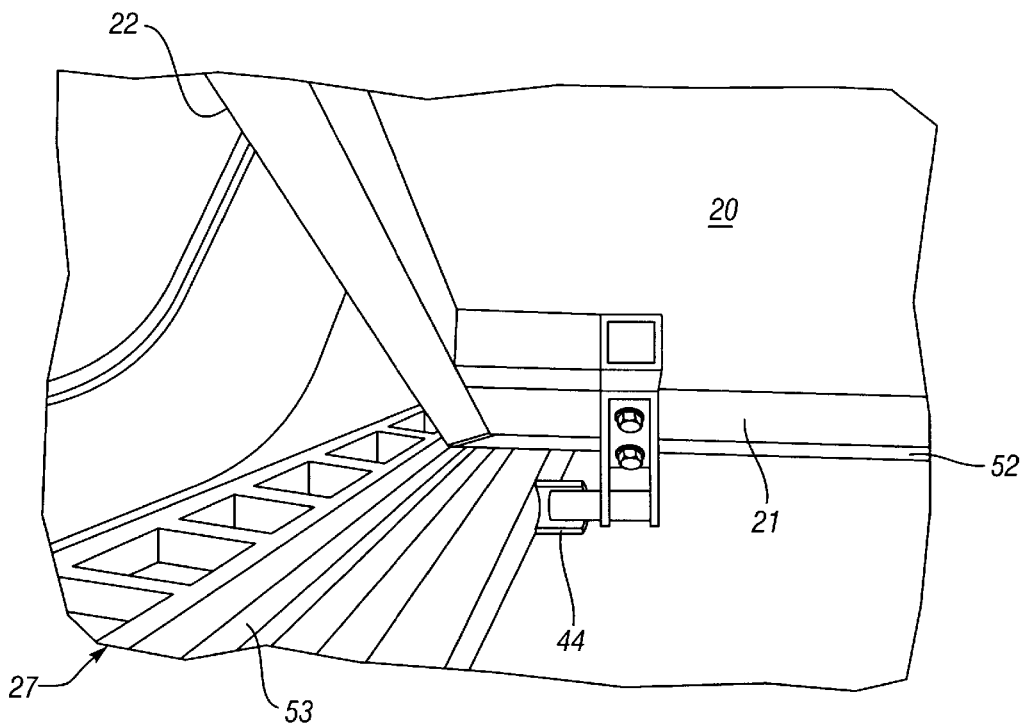
FIG. 17 is a fragmentary perspective view of the dovetail interlock between the leading edge of the tipped-up cargo cover and the vehicle body.

The present invention also simplifies the hardware and packaging necessary to implement the stowed cover concept, and to minimize the changes necessary to implement the concept for the Avalanche® tonneau cover. For instance, the one hundred and thirty degree track angle (FIGS. 5 and 6) at the rear of the rail assembly 32, 33 allows for the use of a mechanical dovetail 44 retention (FIGS. 12, 17) along the leading edge 21 of the cover 20. This interlock provides added security to prevent theft of contents in the event the cable drive or hinge-guide members 40, 42 are disconnected. The dovetail 44 is also used to prevent forward movement of the cover and assists in holding the cover against the reaction forces of the seal system 27, such as cover seal 52, and bedside seal 53, and possibly including also midgate seal 55 (FIGS. 12 and 17).

Cables 41,43 hold cover 20 in place against the gas struts 54,56 for proper hinging at leading edge 21. The cables also stabilize the cover in any position by preventing any relative movement between the left-hand and right-hand hinge-guide members 40, 42. These guide members are prevented from moving in opposite directions of one another because they are both connected to the same pinion or pinions, see FIGS. 19 and 21. This maintains alignment of the cover and prevents binding with or without a motor operated transmission or other power drive system.

Figure 18:
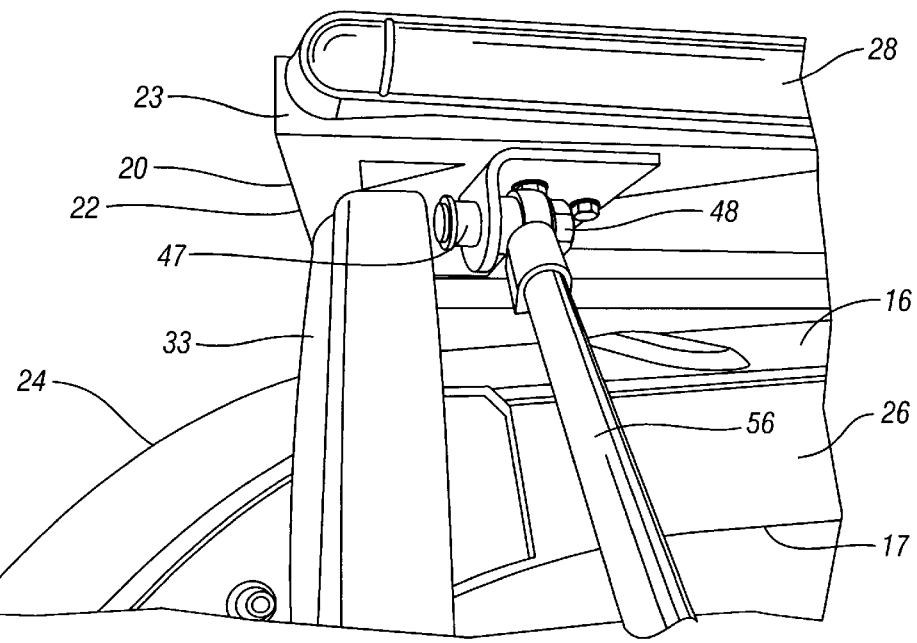
FIG. 18 is a fragmentary perspective view of the guide rail supporting the cargo cover in its stowed position with the telescopic strut connected to and restraining the rear end of the cargo cover with seal.

The exposed guide or roller bracket portion 35 of each hinge-guide member 40,42 at the leading edge 21 of the cover (FIGS. 3, 5, 12 and 14) allows the current functionality of the midgate 15 to be maintained and prevents scrubbing or abrading of the sealing 52, 53 and 55 for the midgate and cargo covers 20 at the midgate opening 17 and along the bedsides of the cargo compartment. The configuration of the guide portion of the hinge-guide member 40,42 also enables moving the curved guide rail assembly 33 inboard of the tumble-home portion 24 of the vehicle body to provide a standard roof rack track appearance when the cover is not stowed on the roof panel (FIGS. 18 and 20).

The guide rail assemblies 32,33 are also inboard of the side edge 22 of the cargo cover 20 and the tumble-home portion 24 of the vehicle body to provide a rest surface for the cover above the roof. This inboard rail location also serves as a lift assist or support for a failed gas strut, for instance 56 if in the position of FIG. 18.

Figure 13:
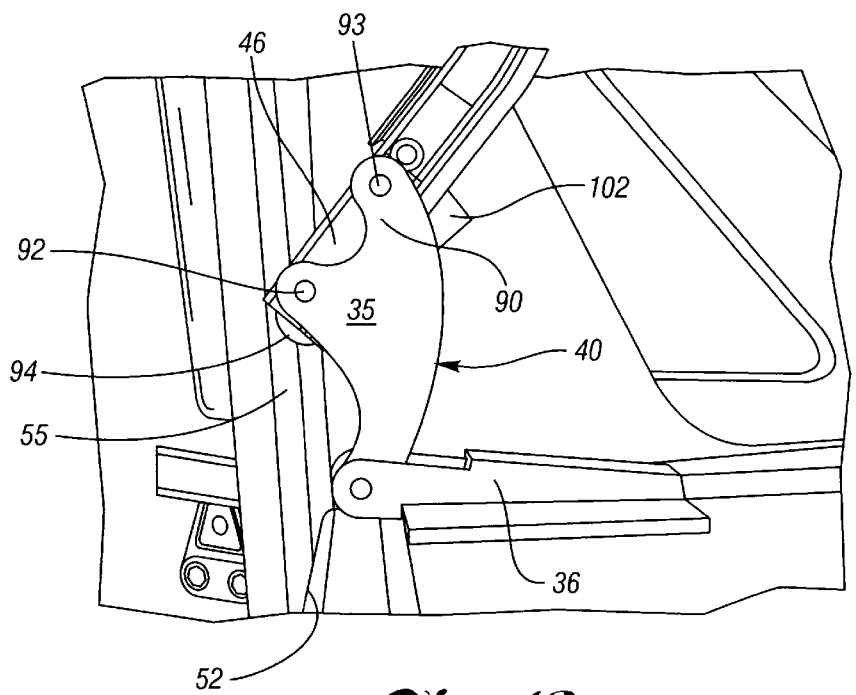
FIG. 13 is a view similar to FIG. 12 from a different angle of the hinge-guide member and curved guide rail assembly to show a stop switch position.
Figure 14:
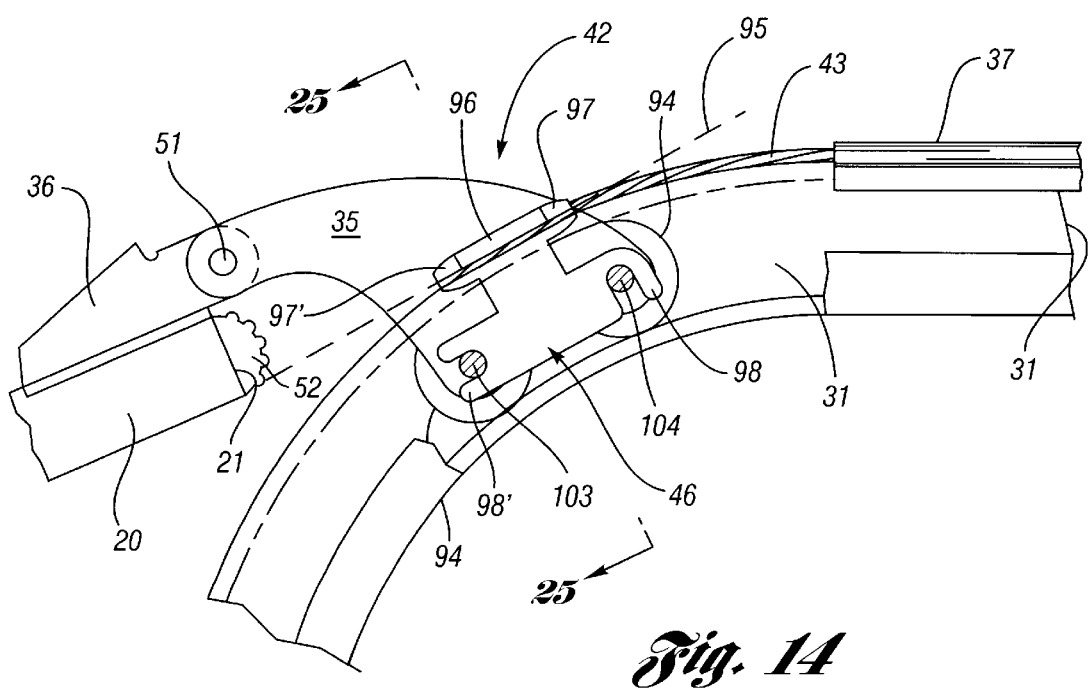
FIG. 14 is a fragmentary perspective view of the guide rail curving downwardly toward the cargo cover along the left side of the passenger compartment of the vehicle body to show the attachment bracket for attaching the roller bracket of the hinge-guide member to the cable.
Figure 15:
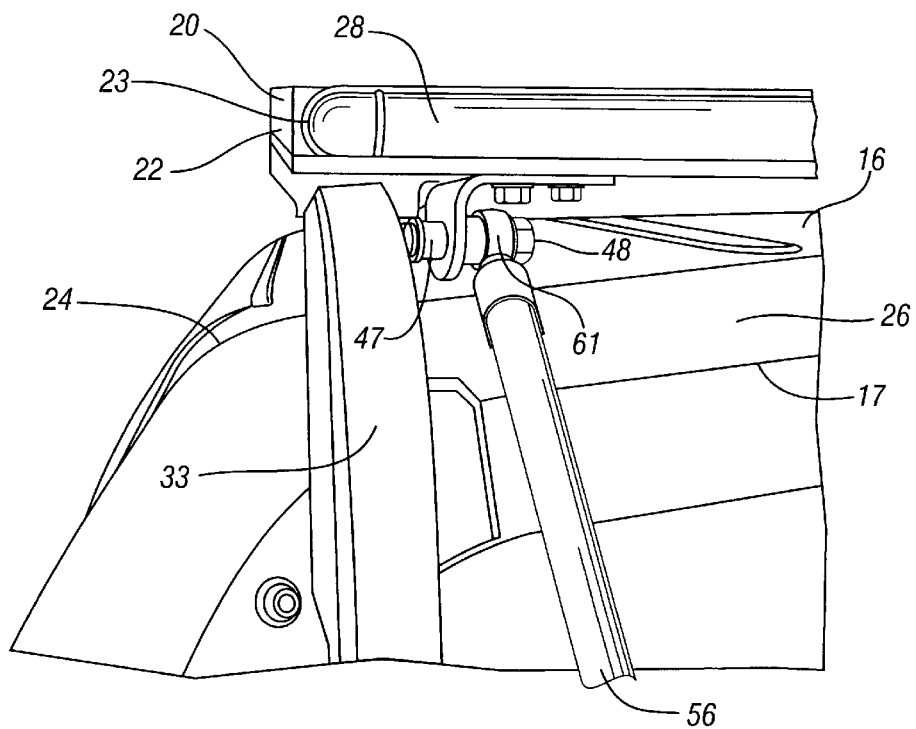
FIG. 15 is a fragmentary perspective view of the curved guide rail along the left side of the passenger compartment inboard the tumble-home portion of the vehicle body and with the cover in the stowed position on the rail.

The leading edge 21 of cover 20 is controlled by the movement of the hinge-guide members 40, 42. With reference to FIGS. 12 and 13, a representative hinge-guide member (right side) 40 has a guide or roller bracket portion 35 in a movably guidable relationship with the C-shaped rail portion 31 of rail assembly 32 and a hinge portion 36 in a pivotably hinged relationship at 51 with the leading edge 21 and seal 52 of the cargo cover 20.

Figure 16:
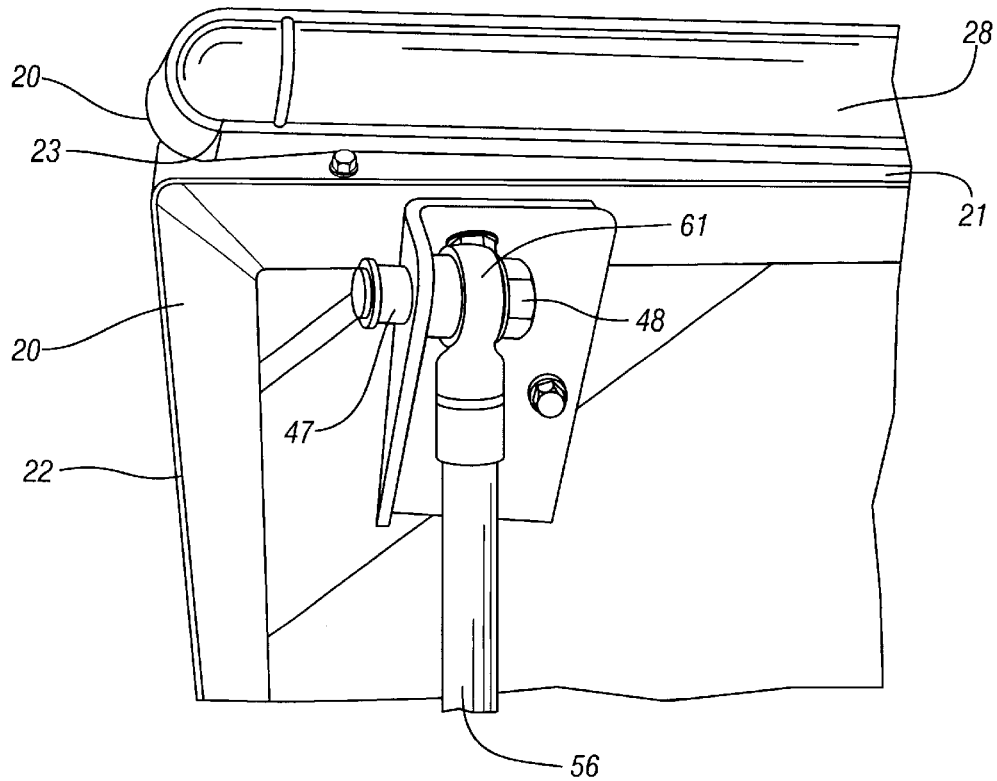
FIG. 16 is a fragmentary perspective view of a latch striker and telescopic strut connection at the rear end of a tipped-up cargo cover with seal.
Figure 24:
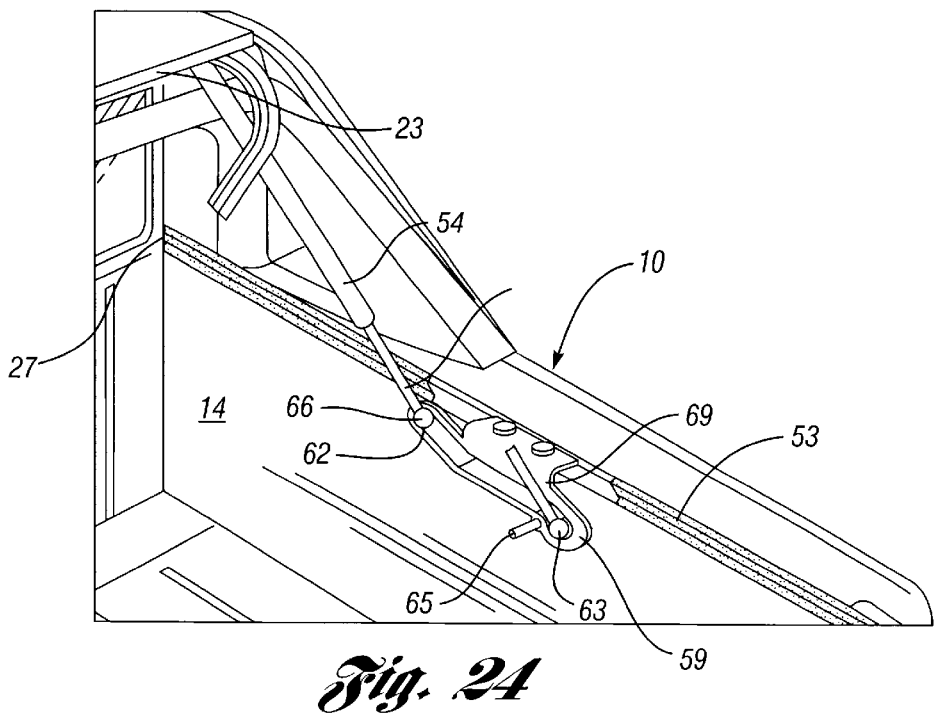
FIG. 24 is a fragmentary perspective view of a gas strut and a slidable body attachment bracket with the cargo cover in the stowed position of FIG. 4.

The trailing edge 23 of cover 20 is controlled by the movement of the extendable gas struts 54, 56. The struts are selected so the trailing edge 23 of the cover can be set fore/aft of the rearmost roof panel structure 26 at the midgate opening. This prevents structural damage to vehicle body portion 26 or cover 20 which could possibly occur from sliding cargo in the cargo compartment. A trailing edge seal 28 also serves this purpose as well as sealing between tailgate and cover. Thus, the trailing edge 23 of the cargo cover is controlled at each side thereof by the extendable or telescoping struts 54, 56 each of which is respectively pivotably connected at their lower ends to opposite sides of the vehicle body in the cargo compartment. At their upper ends 60,61 the struts are connected to the trailing edge 23 of the cargo cover 20 (FIGS. 2 and 16). There are two standard choices for body connections. The first choice is respective fixed pivot brackets 59 (FIG. 4). The second choice is respective slide brackets 69 (FIG. 24). Slide brackets 69 have two positions 62, 63 and a cam 65.

If the slide brackets 69 are chosen, the brackets effectively allow for full travel of the cover 20 using a shorter strut length to minimize overall height of the cover through its travel. Each bracket 69 has a closed and tipped-up position 63 and a roof stowed position 62. Cam 65 operates to release the respective strut 54, 56 for slidable movement of its ball end 66 from the closed and tipped-up position 63 to the stowed position 62 shown in FIG. 24.

A power strut system is also an option and could be used instead of gas struts 54, 56 to provide full power actuation of the cargo cover 20 from the closed to the tipped-up position. Such a system is available from Stabilus GmbH, D56070 Koblenz, Germany and is known as STAB-O-FOCS®, an automatic flap opening and closing system.

The invention provides structure to extend the life of the seal system 27. For this purpose, the roller bracket portion 35 of each hinge-guide member 40,42 is configured with a curved extension 64 in combination with the curved track portion 31 of the guide rail assembly to prevent the cargo cover from scrubbing or abrading seals 52, 53 and possibly 55 of the seal system 27 at the midgate opening 17. And, such configuration in combination with the hinged portion 36, moves the roller bracket portion from a lifting position above the cargo cover in the closed position (FIG. 12) to a pulling position (FIG. 14) and ends up being in a stowed position (FIG. 4) substantially below the cargo cover and curled around its leading edge 21. This enables the side edges 22 of the cargo cover 20 and their hinge-guide members 40, 42 to stay inboard of the tumble-home portions 24 of the vehicle body. In sum, seal scrub abrasion is minimized by the design of the roller bracket, the location of the pivot point above the cover and the rails inboard.

Figure 25:
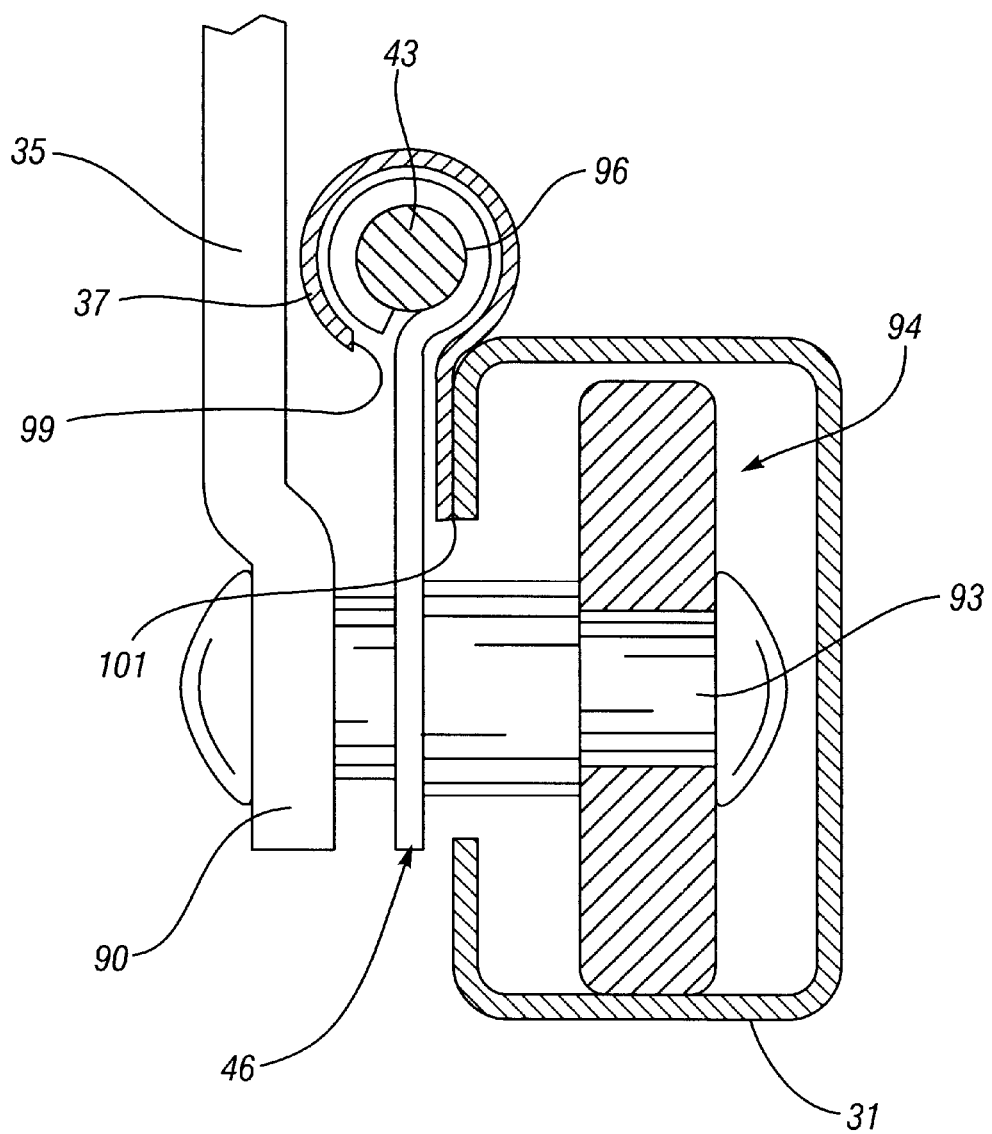
FIG. 25 is a fragmentary view of the hinge-guide member, partly in section, and taken along the line 25—25 in FIG. 14.

With particular reference to FIGS. 12–14 and 25, scrubbing of seals is also prevented by configuring each roller bracket portion 35 with a bifurcated portion 90, having axles 92,93 to rotatably support respective rollers such as 94 on one end of each axle. The cable attachment bracket 46 and the roller bracket portion 35 are on the other end of the axles. The cable attachment bracket hooks onto this other end of the axles to hold the roller bracket portion 35 and rollers together as an anti-rotation, anti-binding unit when the hinge-guide member is movable along the C-shaped track 31. One way to prevent rotation of the cable attachment bracket is shown in FIG. 25. The cables 41, 43 are attached to the cable attachment bracket 46 by a cable interface portion 96 with tapered ends 97 tangent to the track 31. When the roller bracket portion 35 is being pulled or driven along the track, this tangential connection 95 of cable to roller bracket portion 35 is maintained to prevent torque related binding in the track. To complete this roller bracket arrangement, each attachment bracket 46 has notched ends 98 which hook over complementary notched or grooved extensions 103, 104 of the axles 92, 93. The roller bracket portions move along the respective tracks at their respective curves. The radius of the curve in combination with the track-anchored support of the bifurcated portions 90 and the hinged pivot 51 of each roller bracket portion with the hinge portion 36 cooperate to maintain the tangential connection 95. This combination of structure and movement assists in lifting the cargo cover and moving the roller bracket portion from an above position (FIG. 12) to a below position (FIGS. 3 and 4) with respect to the cargo cover. Other attachments between cable and hinge-guide member could be provided. The goal for such attachment, due to high cable loads, is to facilitate cable replacement without replacing the hinge-guide member.

With reference to FIGS. 20 and 25, the cableways 37, 38 along their lengths where the crimped-on attachment bracket moves are open at 99 and attached or welded at 101 to the C-shape track 31. This opening or slit extends to fitting 103 where the slit portion of each cableway joins their respective solid portion at the front of the C-shape tracks (FIG. 20).

Figure 22:
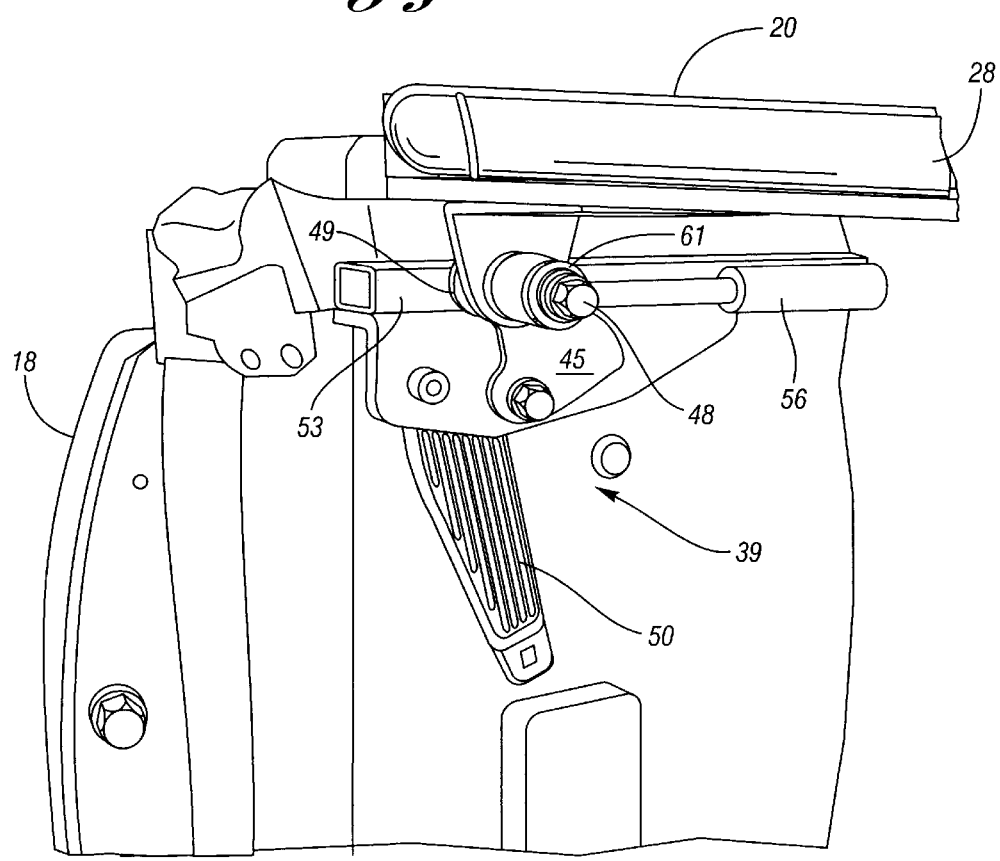
FIG. 22 is a fragmentary perspective view of one of the two latch arms on opposite sides of the cargo compartment in its latched position with respect to the latch striker shown in FIG. 16 on the rear end of the cargo cover.
Figure 23:
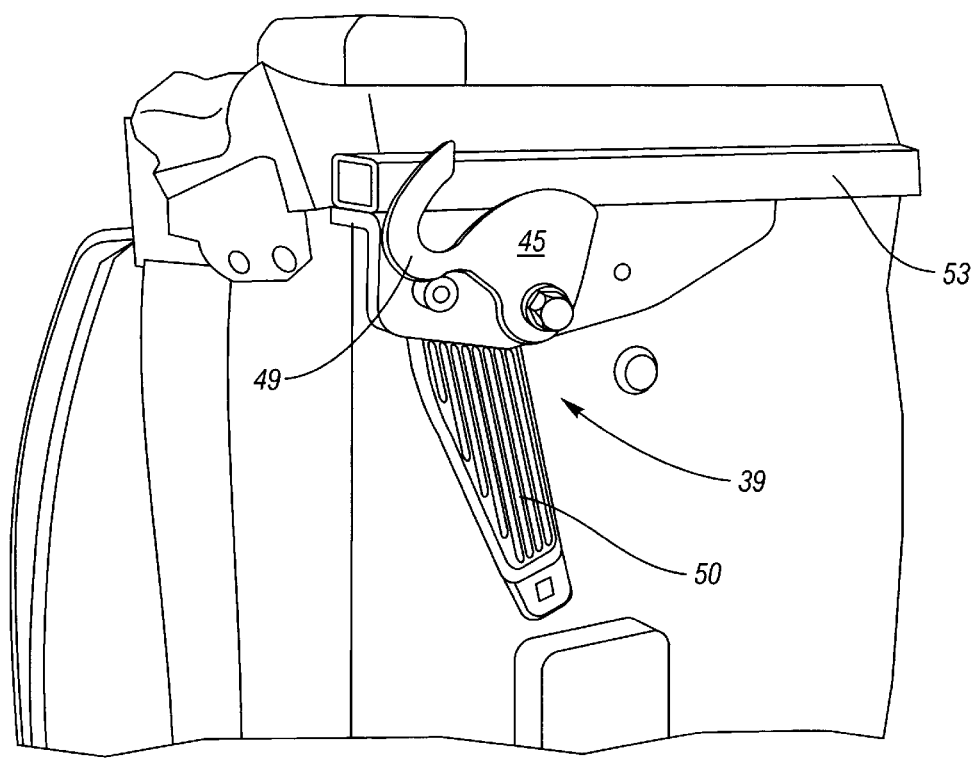
FIG. 23 is a fragmentary perspective view of the latch arm in its unlatched position from the cargo cover.

The cargo compartment should be secure. For this purpose, a latch 39 for the cargo cover is mounted on the inside rear wall of the cargo compartment on each side of the vehicle body (FIGS. 22 and 23). Each latch has a latch bolt 45 with a hook portion 49 engageable with a striker 47 on the cargo cover 20 at its connection with a respective gas strut 54,56 (FIGS. 16 and 18). The striker 47 is an integral extension of a gas strut connecting pin 48. Each latch can be opened by handle 50 from within the locked cargo area without opening the tailgate of the cargo compartment. Each latch is also accessible from outside the cargo compartment with the tailgate open. This provides lockable storage, and with the tailgate closed, minimizes intrusion of the cargo compartment.

Another feature of this invention is a spoiler 100 (FIGS. 1–4) on the front of the roof panel 16 overlaying the passenger compartment 12. The spoiler 100 is configured in cooperation with the leading edge 21 of the cargo cover to cooperate in providing a streamlined configuration as the vehicle moves forward. A luggage rack may also be connected to the top of the cargo cover 20 or to the track portions on top of the passenger compartment. If the roof panel 16 has a sunroof, the forward travel of the cargo cover is controlled by the struts and/or a computer module so that the cover does not interfere with the sunroof or with the travel envelope of the cover outside the operating envelope of the sunroof.

An interlock switch may be added to interrupt power to the transfer system, if desired. FIG. 13 shows a curved portion of the return bend of the guide rail assembly 32 where the hinge-guide member 40 is stopped when the cargo cover 20 is closed. An electrical switch 102 at this location may be used to interrupt electrical power and cargo cover movement when the cargo cover has been properly moved to its closed position. A switch (not shown) for operating the cargo cover may be located in a conveniently accessible, but secure, location, e.g. the jamb of the tailgate opening behind the tailgate.

Figure 3:
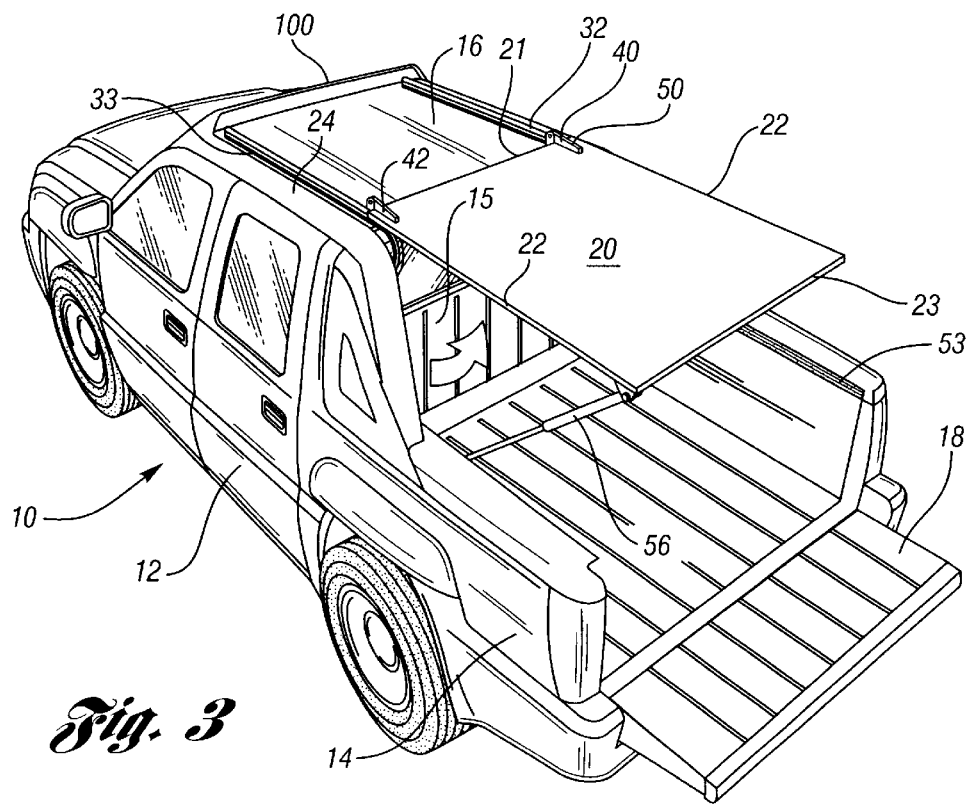
FIG. 3 is a rear perspective view of the vehicle body with the cargo cover shown (arrow) movable to the camper position and the tailgate shown open.
Figure 11:
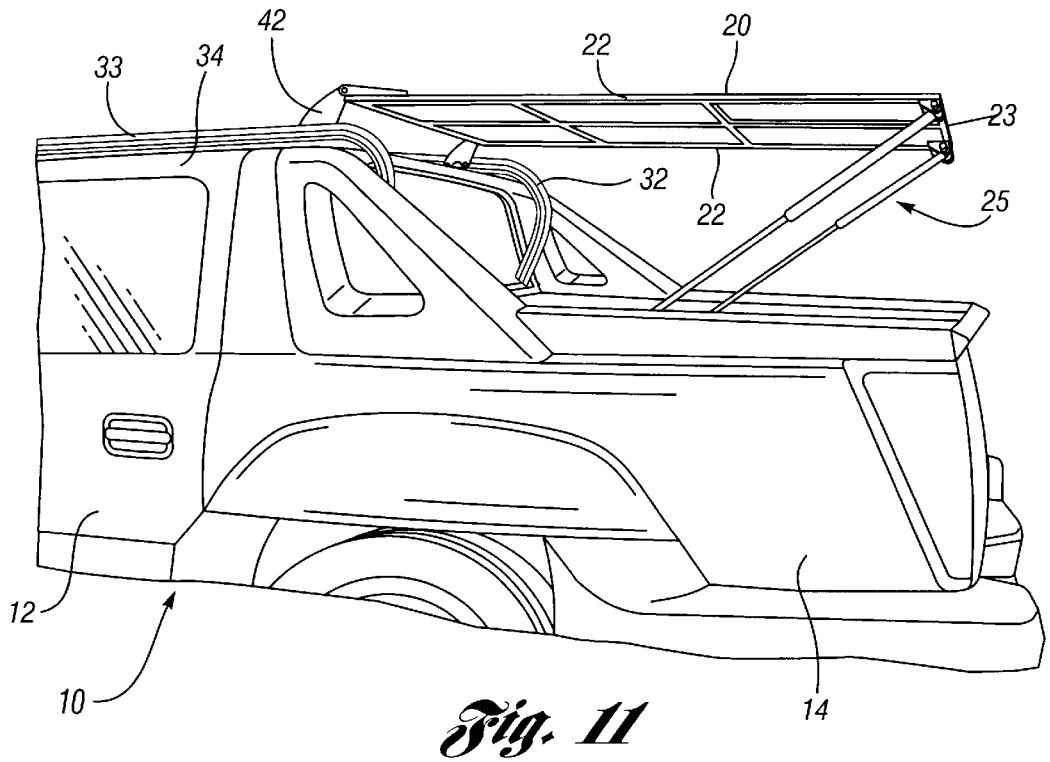
FIG. 11 is a fragmentary perspective view of the cargo cover in a raised and horizontal camper-top position prior to entering the stowed position.

The vehicle body of this invention is also adaptable for camping and hauling long loads. FIGS. 3 and 11 show the cargo cover 20 in a position generally horizontal with the roof top portion of the guide rail and poised to be pulled forward into its stowed position of FIG. 4. In this position, additional links and/or locking struts (not shown) could be added to support and immobilize the cover in its mid-travel position. Such immobilization of the cover allows the cover to be used as a camper top with the addition of zip-on side covers (not shown). This mid-travel position of the cargo cover extends the roof panel 16 to allow long cargo to be hauled on top of the vehicle when supported by the roof panel and cargo cover together.

The transfer system 30 of this invention may also be power driven. With reference to FIGS. 19–21, the transfer system 30 for moving the cargo cover includes transmissions 110,112, electric motors 114,116, cables 41,43, and a curved guide rail assembly 32, 33 respectively on each side of the vehicle roof. Each transmission/motor combination is positioned on the roof of the vehicle body in front of or behind a sunroof 121, if any (FIG. 19). The transmission/motor combinations are adapted to be covered by the air spoiler 100 to protect the motors, transmissions, and exposed cable from the environment. If the transmission/motor combination is behind a sunroof such as 121, a smaller spoiler may be moved rearward sufficiently to cover the combination.

FIG. 21 is an exemplary showing of one transmission 112 with the drive motor 116 removed. A drive pinion 130 is on one end of a motor driveshaft 132. Each cable, 41, 43 has a thread 140, 142 spiraling about the cable and engageable with the teeth of the pinion 130 to pull the cables through the tunnels formed by cableways 37,38. Cableways 37, 38 are solid in FIG. 19 between the front openings of the track or rail assemblies 32, 33. Cableways 37 provide the tunnels for the cables being pulled in tension and cableways 38 provide the tunnels for the slack cables being pushed. Thus, each cable 41,43 is pulled (in tension) by a rotating pinion 130 in each transmission 110,112 through one portion of one cableway and pushed (when slack) through another portion of that cableway on the other side of the rotating pinion and on the opposite side of the vehicle body. Power operation may also be provided by a single motor and at least one or more pinions with the power of the single motor adjusted for the added load.

While the best mode for carrying out the invention has been described in detail, those familiar with the art to which this invention pertains will recognize various alternative designs and embodiments for practicing the invention within the scope of the appended claims.

What is claimed is:

1. A vehicle body comprising a passenger compartment, a cargo compartment, and a midgate opening between the passenger compartment and the cargo compartment, a cargo cover selectively movable between a first position for covering the cargo compartment and a second position for uncovering the cargo compartment, and a transfer system for moving the cargo cover between the first and second positions, the transfer system including:

a rail overlaying the passenger compartment at the second position and extending along the passenger compartment and the midgate opening to the cargo compartment at the first position;

a hinge-guide member having a guide portion in a movably guideable relationship with the rail, and a hinge portion pivotally with a forward portion of the cargo cover; and an extendable strut having one end in a pivotal relationship to the vehicle body and another end in pivotally fixed relationship to a rearward portion of the cargo cover.

2. The vehicle body of claim 1 further comprising a latch between the vehicle body and the rearward portion of the cargo cover and operable to release the cargo cover for guided movement along the rail;

the hinge-guide member guiding the forward portion of the cargo cover along the rail to the second position of the cargo cover for uncovering the cargo compartment; and the extendable strut guiding the rearward portion of the cargo cover to follow the forward portion of the cargo cover as the cargo cover moves between the first and second positions.

3. The vehicle body of claim 1 wherein the hinge portion of the hinge-guide member is pivotally attached to the guide portion.

4. The vehicle body of claim 1 further comprising a seal in relationship to the midgate opening and wherein the rail is curved and the guide portion of the hinge-guide member is a bifurcated roller bracket having a pair of rollers in the curved rail so that the cargo cover will not scrub the seal when the cargo cover is moved.

5. The vehicle body of claims 4 wherein the rail angles at substantially fifty-five degrees to subtend an arc where the rail curvingly extends from overlaying the passenger compartment toward the cargo compartment.

6. The vehicle body of claim 4 wherein the rail includes a cableway enclosing a drivable cable extending therethrough and sufficiently tangentially connected at a first end with respect to the roller bracket so that the roller bracket does not bind in the rail when the cargo cover is being moved.

7. The vehicle body of claim 6 further comprising a pair of rails respectively on opposite sides of the passenger compartment and a pair of drivable cables respectively extending through respective cableways on both sides of the passenger compartment.

8. The vehicle body of claim 1 further comprising a spoiler on the passenger compartment in front of the cargo cover in its second position to deflect airflow when the vehicle body is moving.

9. The vehicle body of claim 6 further comprising a motor-operated transmission connected to a seond end of the drivable cable for driving the drivable cable and a spoiler on the passenger compartment configured to deflect air flow when the vehicle body is moving and to cover the motor.

10. The vehicle body of claim 6 further comprising a motor-operated transmission for driving the drivable cable, and wherein the motor is electrically actuatable and the rail includes a switch to interrupt actuation of the motor when the cargo cover is moved to its first position.

11. The vehicle body of claim 1 further comprising a second rail wherein the rails overlay each side of the passenger compartment and each rail being configured as a C-shaped track having a guide-receiving portion for receiving the guide portion of the hinge-guide member and a cable portion including a pair of cableways, and a drivable cable having a pullable portion connected to the guide portion and extending through one portion of one of the cableways on one of the C-shaped tracks and a pushable portion extending through another portion of one of the cableways on the other of the C-shaped tracks.

12. The vehicle body of claim 11 further comprising a transmission having at least one rotatable pinion in a driving relationship with the drivable cable and operable to pull the pullable portion of the cable to move the cargo cover and to pay out the pushable portion of the cable to stow the cable paid out.

13. The vehicle body of claim 2, wherein the transfer system moves the cargo cover to a third position between the first and second positions wherein the third position the cargo cover extends parallel to and rearward of a roof of the passenger compartment and sufficiently above the cargo compartment to convert the cargo cover into a camper top.

* * * * *